United States Patent [19]

Janssen et al.

[11] Patent Number: 4,460,213
[45] Date of Patent: Jul. 17, 1984

[54] MOTOR VEHICLE FRONT END WITH AN ADJUSTABLE AIRFLOW DEVICE

[75] Inventors: Lutz J. Janssen, Munich; Helmuth Schrader, Cologne, both of Fed. Rep. of Germany

[73] Assignee: Ford Motor Company, Dearborn, Mich.

[21] Appl. No.: 408,952

[22] Filed: Aug. 17, 1982

[30] Foreign Application Priority Data

Aug. 17, 1981 [DE] Fed. Rep. of Germany ....... 3132341

[51] Int. Cl.³ .............................................. B62D 37/02
[52] U.S. Cl. ...................................................... 296/1 S
[58] Field of Search ......................................... 296/1 S

[56] References Cited

U.S. PATENT DOCUMENTS 3,618,998  11/1971  Swanger ............................. 296/1 S

FOREIGN PATENT DOCUMENTS 2616948  12/1979  Fed. Rep. of Germany ...... 296/1 S
2017023   9/1979  United Kingdom ................ 296/1 S
30122     6/1981  United Kingdom ................ 296/1 S Primary Examiner—Robert R. Song
Attorney, Agent, or Firm—Daniel M. Stock; Clifford L. Sadler

[57] ABSTRACT

In a motor car front end with an adjustable air-conducting means in the form of a nose apron which is arranged beneath the bumper and which may be tilted downwards about a transverse axis as a function of the velocity of travel, the nose apron (1) has a well rounded front edge (2) and its adjacent, tapering area is provided with reinforcing corrugations (3) and cooling air outlet ports (4). In its lowered position at high velocities of travel the nose apron (1) forms, relative to the road surface, a narrow Venturi cross-section (10) which causes an area of underpressure which results in a reduction of air resistance. In its raised position at low velocities of travel the nose apron (1) forms an ordinary angle of repose relative to the road surface and covers part of the radiator (22) from excessive throughflow.

3 Claims, 5 Drawing Figures

MOTOR VEHICLE FRONT END WITH AN ADJUSTABLE AIRFLOW DEVICE

The invention relates to a motor car front end with an adjustable air-conducting means in the form of a nose apron which is arranged beneath the bumper and which may be tilted downwards about a transverse axis as a function of the velocity of travel.

A motor car front end of this type is already known from the German Patent No. 26 16 948. In this case the nose apron which is arranged beneath the bumper and may be tilted about a transverse axis as a function of the velocity of travel is constructed in the manner of a spoiler, i.e. it has only a relatively slight extension in the longitudinal direction of the vehicle. Although the lift on the front axle of the vehicle is accordingly reduced in a desirable manner, this is achieved at the cost of an increase in the overall air resistance of the motor car.

A further motor car front end of the type described above is known from the German Gebrauchsmuster (Utility Model) No. 79 06 193. In the case of this design the nose apron which is arranged beneath the bumper and may be tilted downwards about a transverse axis as a function of the velocity of travel is rounded rather more towards the bottom and also drawn laterally towards the wheel openings in the bodywork. In this case the tilting of the nose apron may be selectively controlled by an electric motor, i.e. both as a function of the velocity of travel and in accordance with individual requirements.

A further motor car front end is known from the German Gebrauchsmuster 79 23 144, the nose apron of which cannot be tilted but is provided with base walls in the side area.

The object of the invention is to design a motor car front end of the type described above in such a way that not only a desired reduction in the lift on the front axle is achieved as before, but in addition, by virtue of the special profiling and positioning of the nose apron, a substantial reduction in the overall air resistance of the motor car is achieved particularly in the case of high velocities of travel while the nose apron is lowered, and at the same time the precondition is provided for a lowresistance flow along the underside of the motor car.

This object is attained according to the invention in that a motor car front end according to the preamble of Patent claim 1 has the features set out in the characterizing part of Patent claim 1. Further advantageous developments of the invention are set out in claims 2 and 3.

By virtue of the fact that the nose apron has a well rounded front edge and its adjacent, tapering area is provided with reinforcing corrugations and cooling air outlet ports, a favourable incident flow free from flow separation along the underside of the nose of the motor car is achieved.

By virtue of the fact that in its lowered position at high velocities of travel the nose apron forms, relative to the road surface, a Venturi cross-section to which is joined a gradual extension tapering towards the pivot axis, a considerable reduction in the air resistance is achieved as a result of the special air distribution.

By virtue of the fact that in its raised position at low velocities of travel the nose apron forms an ordinary angle of repose with respect to the road surface and restricts the admission to the radiator with its internal contour, an adequate ground clearance is ensured during manoeuvring on the one hand and an excessive flow through the radiator which is unnecessary in the case of partial load is avoided on the other hand.

The invention is described in greater detail with reference to an example of embodiment illustrated in the attached drawings, in which FIG. 1 is a diagrammatic vertical section through a motor car front end according to the invention;

Figure 1:
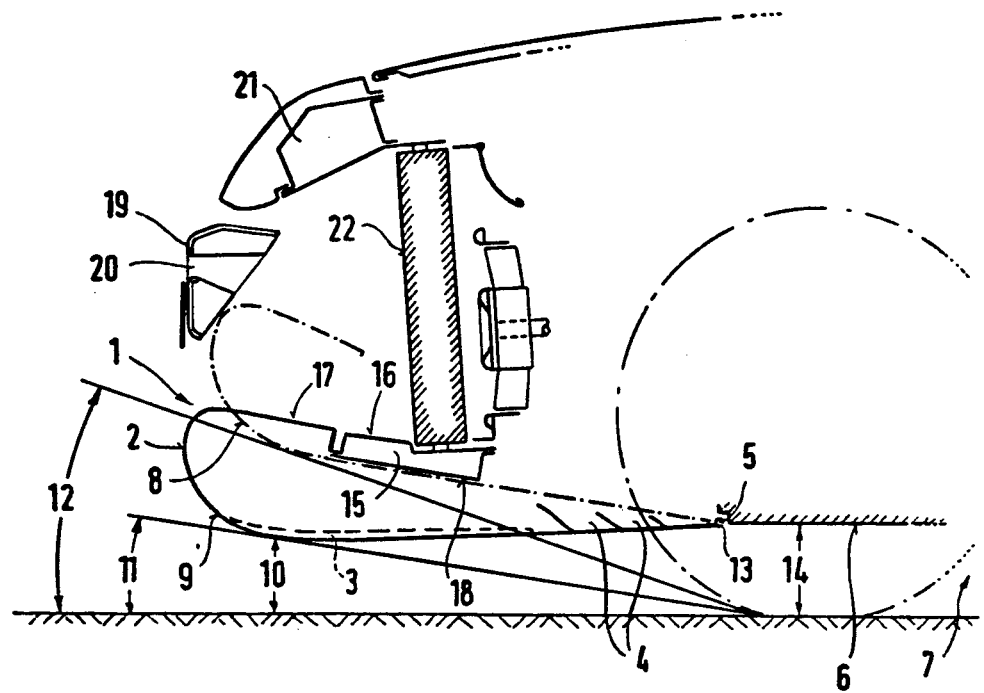

The Figures show a pivotable nose apron 1 arranged beneath the bumper and in front of the front axle. The front edge 2 of the nose apron 1 is well rounded and the base area thereof is provided with reinforcing corrugations 3 and cooling air outlet ports 4. The pivot axis 5, about which the nose apron 1 can tilt from its lowered position shown in solid lines in FIG. 1 into its raised position shown in dash-dot lines, lies immediately in front of the front axle. A central undercovering 6 not shown and a diffusor tail covering 7, which may likewise be made aerodynamic, may advantageously be joined to the rear edge of the nose apron 1.

The raised position of the nose apron 1 shown in dashdot lines is designated 8, while the lowered position of the nose apron 1 shown in solid lines is designated 9. In the lowered position 9 of the nose apron 1 a Venturi crosssection 10, which corresponds to an angle of repose 11 sufficient for travel over a level road, is produced with respect to the road surface.

In the raised position 8 of the nose apron 1 an angle of repose 12, which corresponds to a normal angle of repose in motor cars, is formed by the nose apron 1 and the road surface.

The pivot axis 5 of the nose apron 1 is disposed at the point 13 approximately at the level of the normal ground clearance 14 of a motor car.

A front, lower crossbar 15 is arranged in the vicinity of the nose apron 1 and its upper surface 16 may act at the same time as a support for the radiator and engine. In this case the upper surface 16 of the crossbar 15 and the upper surface 17 of the nose apron 1 form an airconducting means to the radiator of the motor car. In this connexion the underside 18 of the crossbar 15 is designed in such a way that the nose apron 1 may be moved into the desired raised position.

An additional inflow opening 20 may be provided in the vicinity of the bumper 19 in order to ensure an adequate admission of cooling air to the radiator when the nose apron 1 is raised. The upper crossbar or lock bar 21 likewise forms part of the air supply to the radiator 22 of the motor car.

Figure 2:
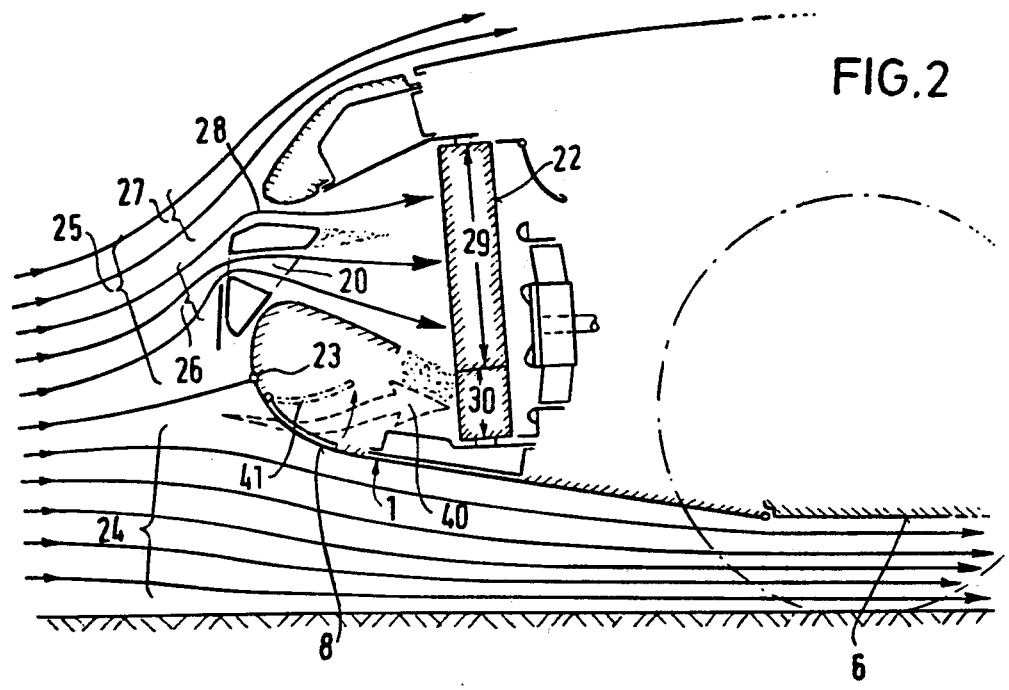
FIG. 2 is a similar section to FIG. 1 with the nose apron raised and showing the path of flow.

In FIG. 2 the same components are provided with the same reference numerals and, in addition, the flow patterns are indicated. In the raised position 8 of the nose apron 1 the stagnation point is formed at 23. Here the flow arriving at the nose of the vehicle is divided into the lower flow 24 and the upper flow 25. The lower flow 24 is conveyed to the central undercovering 6 without flow separation.

The upper flow 25 is divided into the flow 27 over the engine bonnet and the cooling air throughflow 26. Only the inflow opening 20 in the bumper and the area 28 above the latter are used for the supply of cooling air. The flow essentially passes only through the area 29 of the radiator 22 and with a reduced flow velocity. The area 30 of the radiator 22 is completely covered. The reduced cooling capacity is acceptable since the raised manoeuvring position or raised condition 8 of the nose apron 1 is provided only for low velocities of travel (less than 40 km/h) at which only a low engine performance is required. In the undesirable case of a stop-start operation with a heavy load and on inclines this reduced cooling capacity would not be sufficient, so that an additional cooling flow 40 may be provided in the nose apron 1 by opening an additional cooling air flap 41 controlled as a function of the engine temperature.

Figure 3:
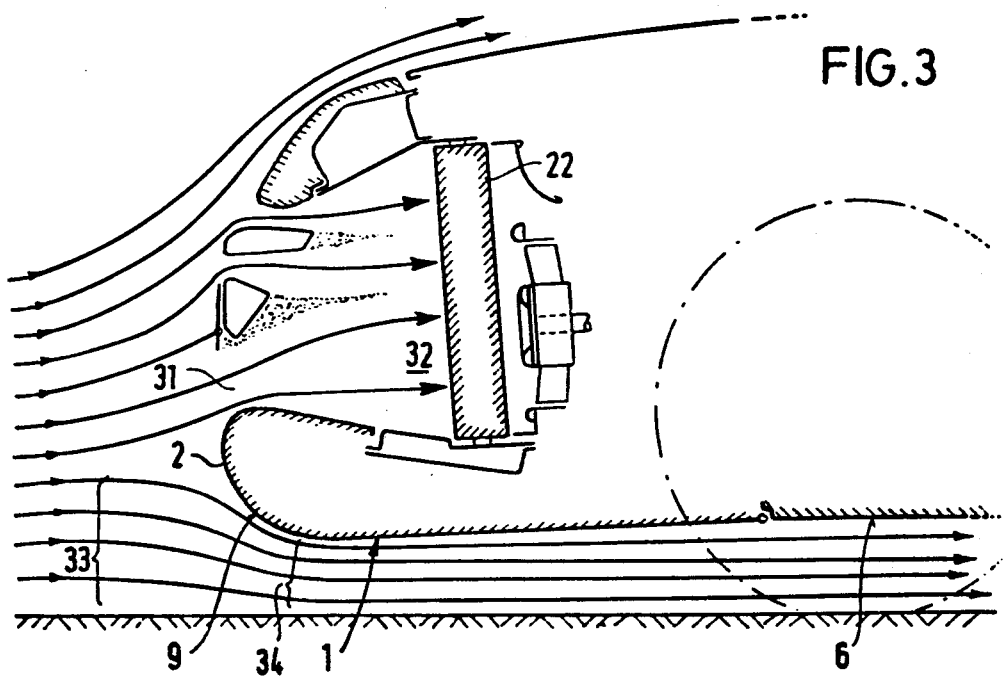
FIG. 3 is a similar section to FIG. 1 with the nose apron lowered and showing the path of flow.

In FIG. 3 the nose apron 1 is shown in its lowered position 9 in which it uncovers a main cooling air inlet opening 31 which permits an unhindered flow 32 to the radiator 22. In this case the somewhat reduced lower flow 33 is forced into the Venturi-shaped area 34 by the strongly rounded front edge 2 of the nose apron 1.

Figure 4:
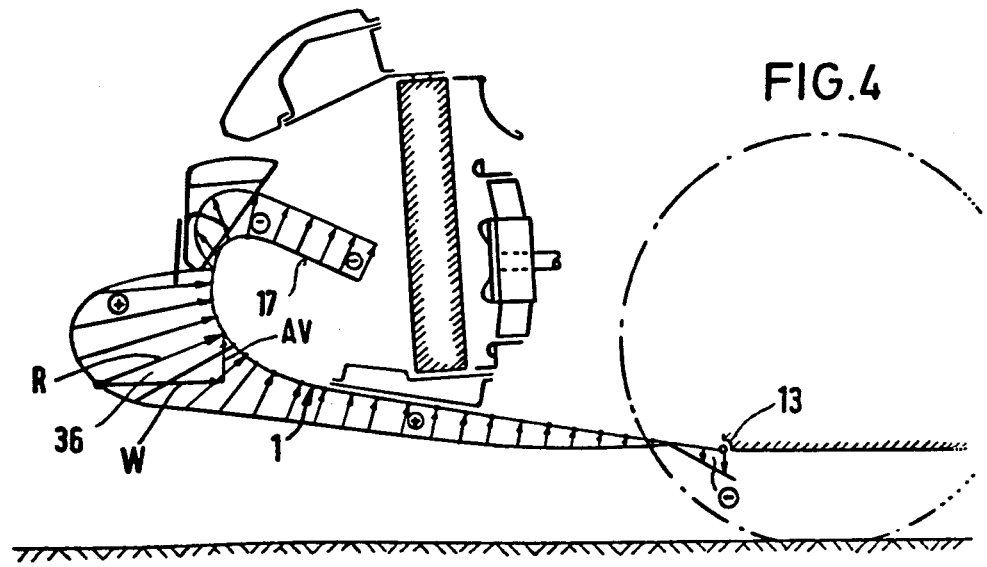
FIG. 4 is a similar section to FIG. 2 showing the pressure distribution.
Figure 5:
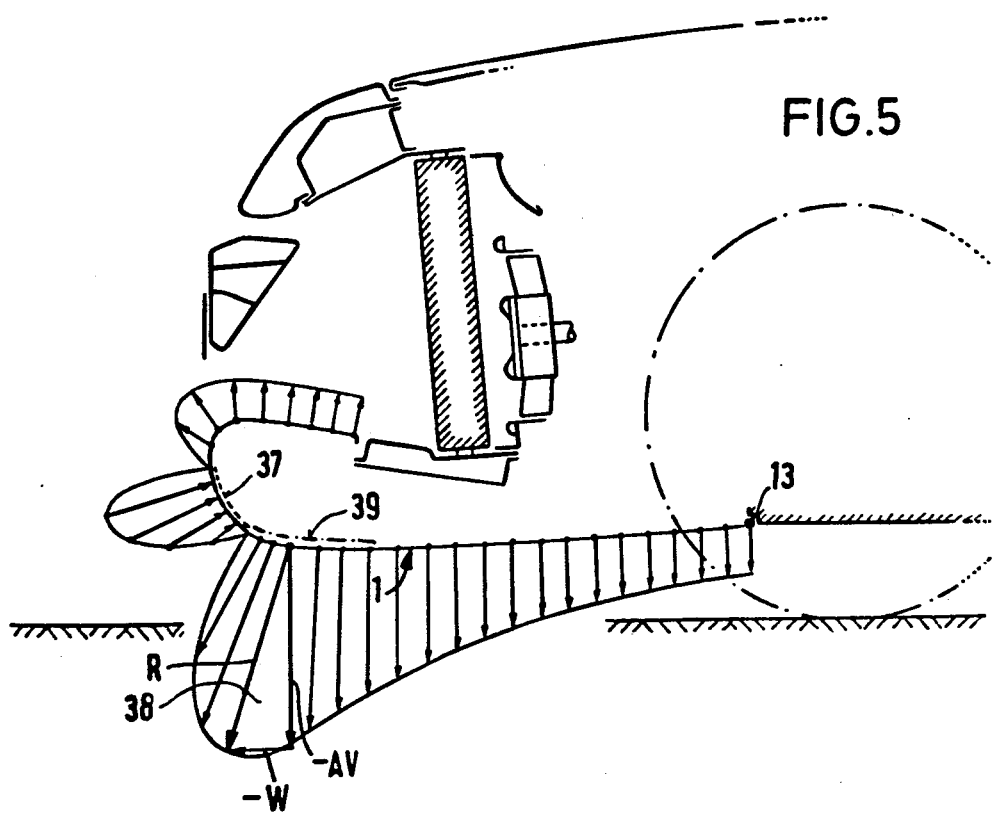
FIG. 5 is a similar section to FIG. 3 showing the pressure distribution.

FIGS. 4 and 5 show the pressure distribution - as measured in a wind tunnel on a one-to-one model of a nose apron 1 according to the invention - in the usual manner as vectors perpendicular to the outer contour in the form of the non-dimensional pressure coefficient CD. In this case the overpressure is shown as a vector with an arrowhead towards the contour and the underpressure as a vector with an arrowhead away from the contour.

As is evident from FIG. 4, in the raised position of the nose apron 1 there is an overpressure over almost the entire contour of the latter and there is only a slight underpressure at its upper surface 17 inside the cooling air cavity and immediately in front of the pivot axis 13.

The overpressure R acting perpendicularly upon the nose apron 1 (at 36) may be divided into a partial resistance W and a partial lift AV.

In its manoeuvring position or in its raised position the nose apron acts, therefore, like a conventional vehicle nose.

If we look at FIG. 5, in which the nose apron 1 is shown in its lowered position, it is apparent that with the exception of a small area at 37 in which there is an overpressure a quite considerable underpressure prevails in a large area at 38. The underpressure R acting perpendicularly upon the nose apron 1 (at 38) may be analysed as being a negative lift $-AV=$ depression and a negative resistance $-W=$ propulsion. This propulsion component $-W$ is the reason for the reduction in resistance of the nose apron. It should be noted that this propulsion component W (sic) is effective only in the area 39.

We claim:

1. A motor car front end with an adjustable air-conducting means in the form of a nose apron which is arranged beneath the bumper and which may be tilted downwards about a transverse axis as a function of the velocity of travel, characterized in that the nose apron (1) has a well rounded front edge (2) and has an adjacent area tapering therefrom toward the transverse axis, this area being provided with reinforcing corrugations (3) and cooling air outlet ports (4).

2. A motor car front end according to claim 1, characterized in that in its lowered position (9) at a high velocity of travel the nose apron (1) forms, relative to the road surface, a Venturi cross-section (10) to which is joined a gradual extension tapering towards the transverse axis (5).

3. A motor car front end according to claim 1, characterized in that in its raised position (8) at low velocities of travel the nose apron (1) forms an ordinary angle of repose (12) relative to the road surface and limits airflow over the nose apron.

* * * * *